2,450,696

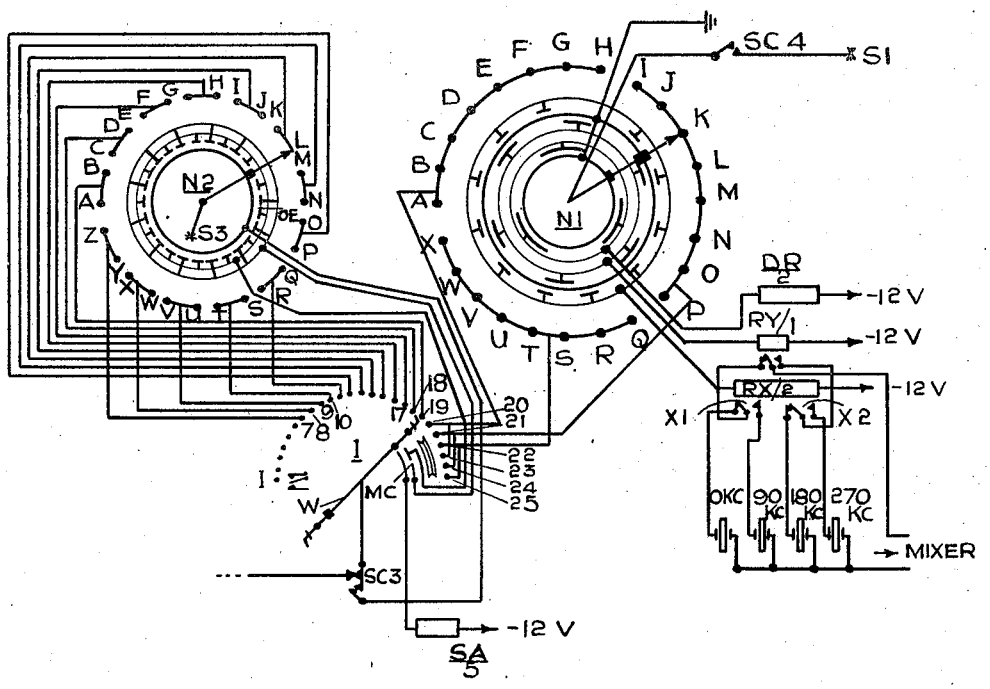
| MINOR SELECTOR CONTACT | A | B | C | D | E | F | G | H | I | J | K | L | M | N | O | P | Q | R | S | T | U | V | W | X |
|---|---|---|---|---|---|---|---|---|---|---|---|---|---|---|---|---|---|---|---|---|---|---|---|---|
| RELAY DR |   |   |   | • | • | • | • |   |   |   |   | • | • | • | • |   |   |   |   | • | • | • | • |   |
| RELAY RX | • |   | • | • | • |   | • | • | • |   | • | • | • |   | • | • | • |   | • | • | • |   | • | • |
| RELAY RY |   |   | • | • |   |   | • | • |   |   | • | • |   |   | • | • |   |   | • | • |   |   | • | • |
| Osc. 0 Kc | • |   |   |   | • |   |   |   | • |   |   |   | • |   |   |   | • |   |   |   | • |   |   |   |
| Osc. 90 Kc |   | • |   |   |   | • |   |   |   | • |   |   |   | • |   |   |   | • |   |   |   | • |   |   |
| Osc. 180 Kc |   |   | • |   |   |   | • |   |   |   | • |   |   |   | • |   |   |   | • |   |   |   | • |   |
| Osc. 270 Kc |   |   |   | • |   |   |   | • |   |   |   | • |   |   |   | • |   |   |   | • |   |   |   | • |
INVENTOR
LUIS CHARLES STENNING Patented Oct. 5, 1948

UNITED STATES PATENT OFFICE 2,450,696

APPARATUS FOR TUNING VARIABLE ELECTRICAL OSCILLATORS

Luis Charles Stenning, London, England, assignor to The General Electric Company Limited, London, England Application February 12, 1946, Serial No. 647,004 In Great Britain January 22, 1945

Section 1, Public Law 690, August 8, 1946 Patent expires January 22, 1965

11 Claims. (Cl. 250—36)

This invention relates to apparatus for tuning a variable electrical oscillator and is an improvement in or modification of the invention described and claimed in United States Letters Patent #2,401,604 issued June 4, 1946, on application #515,400, filed in the United States on December 23, 1943. For convenience, said United States Letters Patent #2,401,604 will be referred to hereinafter simply as "said patent."

Said patent describes and claims apparatus for tuning a variable electrical oscillator including driving means capable of varying continuously in the same direction the frequency $f$ of the oscillator, means for generating alternatively a first set of standard frequencies spaced at minor intervals $f_0$, to one of which the variable oscillator has to be tuned, and a second set of standard frequencies spaced at major intervals $mf_0$, where $m$ is an integer, an automatic selector switch, including a wiper, a plurality of studs, and electrically actuable wiper moving means, said switch being responsive to coincidences between the frequency of the variable oscillator and said standard frequencies for applying to the automatic selector switch, on the occasion of each such coincidence, a pulse serving to move its wiper one step, changeover means associated with the automatic selector switch for causing the second set of standard frequencies to be replaced by the first set when the wiper reaches a predetermined stud of the automatic selector switch, means for varying at the will of an operator the number of steps that the wiper must take under the control of the coincidences before it reaches the predetermined stud and stopping means adapted to be associated at the will of the operator with different studs of the automatic selector switch and serving to put the driving means out of action when the wiper reaches the stud with which the stopping means are associated.

Said patent also describes and claims a modification of such apparatus wherein the said changeover means are permanently associated with a predetermined stud of the automatic selector switch and means are provided for varying at the will of the operator the number of steps that the automatic selector switch must take under the control of coincidences between the variable oscillator frequency and the set of standard frequencies spaced at major intervals before it reaches the said predetermined stud.

The invention is particularly concerned with this second form of the apparatus, but is applicable in some of its aspects to both.

In the present specification the terms "automatic selector switch," "tuning, or setting, to a standard frequency," and "coincidence with a standard frequency," have the same significance as in said patent.

In using apparatus in accordance with said patent, if $mf_0$ is the major interval and $f_0$ the minor interval, the operator considers any required frequency in the form of $(n_2m+n_1)f_0$ and arranges the apparatus to give $n_2$ coincidences with the second set of standard frequencies and $n_1$ coincidences with the first set, where $n_1$ and $n_2$ are integers, the variable oscillator is then rapidly and accurately tuned to the required frequency. The primary object of the instant invention is to provide means for further increasing the ease and rapidity with which the required tuning can be obtained, particularly when the number of possible tuning positions is very large, for example of the order of 600.

To achieve this object an extension is made according to one aspect of the invention of the principle underlying the use of the four contact positions, e. g. A, B, C, D, associated with each stud of the minor selector switch N1 shown at the top right hand side of Fig. 1 of the drawings accompanying said patent. It is explained in said patent how two cams on the contact arm of N1 can operate two sets of contacts of which one reverses the discriminator control on passing from one pair of contacts (A, B) to the other pair (C, D) so as to set the variable oscillator frequency at $nf_0+¼f_0$ or $nf_0-¼f_0$ respectively, where $n$ is an integer corresponding to one of the standard frequencies spaced at minor intervals, and the other effectively raises the standard frequency by $¼f_0$ on passing from A to B or C to D by replacing a heterodyning oscillator used with the A and C positions by another oscillator of frequency $¼f_0$ higher, so as to give an effective minor frequency interval at $¼f_0$.

The use of one heterodyning oscillator is, in this particular case, essential to the setting of the variable oscillator frequency; the second heterodyning oscillator is an alternative heterodyning oscillator adapted to vary the mean frequency on either side of which the variable oscillator frequency is adapted to be set by the reversal of the discriminator control. By increasing the number of such alternative heterodyning oscillators it is thus possible to increase the number of variable oscillator frequency settings which can be obtained with one standard frequency, thereby reducing the number of standard frequencies required to obtain a given number of frequency settings.

It is not essential to all forms of apparatus in accordance with said patent that a heterodyning oscillation should normally be used in setting the variable oscillator frequency to a required value; but where no such heterodyning oscillation is normally used, heterodyning oscillators may still be used to produce shifts in the value of the mean frequency, say $f_m$, about which the variable oscillator frequency is normally set; for example the oscillations from the variable oscillator may be directly combined in a mixer with different heterodyning oscillations so as effectively to produce progressive shifts in the value of $f_m$.

According therefore to one aspect of the invention, in apparatus according to claim 1 or claim 2 of said patent, the said stopping means is associated with positioning means adapted to set the frequency of the variable oscillator at the will of the operator either to a value $f_m+D$ or to a value $f_m-D$, where $f_m$ is determined by the stud of the automatic selector switch with which the stopping means is associated and D is substantially a constant independent of $f_m$, and the apparatus comprises, possibly together with a further heterodyning oscillator normally required for the determination of $f_m$, a plurality of heterodyning oscillators each adapted effectively to vary at the will of the operator the said frequency $f_m$, each by a different amount and the appropriate one of which is arranged to be automatically selected by the stopping means.

It will be appreciated that in the arrangement referred to in connection with the drawing accompanying said patent, there is effectively only one heterodyning oscillator adapted to vary the frequency $f_m$, the other oscillator being normally required to determine $f_m$; the frequency $f_m$ is referred to in the said arrangement as $nf_0$, the value of D being $\frac{1}{4}f_0$ and the variation produced in $f_m$ by the said heterodyning oscillator being $\frac{1}{2}f_0$.

The application of the invention in general form to the modification of this arrangement will now be described by way of example.

Suppose that in the final arrangement there are N different frequencies, spaced at intervals of $xf_0$ to any one of which the variable oscillator may have to be set, where $x$ is a factor by which the variable oscillator frequencies are finally multiplied before use. We need therefore only consider the initial setting of the variable oscillator to N different frequencies spaced at intervals of $f_0$.

Suppose that the discriminator controls to $\pm af_0$, i. e. that the spacing D about the frequency $f_m$ obtained by reversal of the discriminator control is $\pm af_0$ where $a$ is a constant in any particular case; then if effective minor spacings of $f_0$ are to be obtained we must have $a \geq \frac{1}{2}$.

If $a = \frac{1}{2}$, a spacing of frequencies at uniform intervals of $f_0$ may be obtained by successively raising the frequency $f_m$ by $2f_0$ and obtaining the two discriminator controls at each of the raised frequencies.

Thus if each stud of the minor selector switch is associated with $a$ alternative heterodyning oscillators (of which $(a-1)$ constitute the plurality in accordance with the invention), where $a$ is an integer, whose frequencies increase successively by $2f_0$, the oscillators being automatically switched in and out by a cam carried by the moving contact arm of the switch, and if further contact points on each stud are provided for securing discriminator control reversal by means of a second cam, then $2a$ contact points on each stud will enable a range of $2a$ frequencies spaced at intervals of $f_0$ to be obtained on each stud. For continued uniform frequency spacing the frequency interval from one stud to the next must be $2af_0$ so that the minor standard comparison frequencies have to be generated at intervals of $2af_0$; if there are $b$ studs a total range of frequency of $2abf_0$ can be covered by the minor selector switch. The major interval required is therefore $2abf_0$.

Thus there will be required only $N/2ab$ major studs on the automatic selector switch, i. e. studs associated with standard frequencies spaced at major intervals, and $b$ minor studs, i. e. studs associated with standard frequencies spaced at minor intervals.

We have now to consider the case where $a$ is greater than $\frac{1}{2}$. In order to secure uniform frequency spacing at intervals of $f_0$, $a$ must be integral. By providing $2a$ alternative heterodyning oscillators (of which $(2a-1)$ constitute the plurality in accordance with the invention) increasing in frequency successively by $f_0$, frequencies uniformly spaced at intervals of $f_0$ can be obtained from minor comparison frequencies spaced at $4af_0$. Each minor selector stud will therefore require $4a$ contact positions and if there are $b$ studs the major interval required will be $4abf_0$ and only $N/4ab$ major studs on the automatic selector switch are required. The arrangement is thus the same as that already described for $a = \frac{1}{2}$ with $2a$ substituted for $a$, and the same considerations apply in respect of cams controlling the discriminator reversal and switching of alternative heterodyning oscillators on passing from one contact position to another on a stud of the minor selector switch.

According to a second feature of the invention the number of major studs required on the automatic selector switch is further reduced by coupling together the studs of the major selector switch in groups of $c$, each group being connected to the same major stud of the automatic selector switch, by providing $bc$ minor studs in the automatic selector switch and coupling the minor studs together in $b$ groups of $c$ per group, the studs in each group being spaced at intervals $c$, i. e. first group comprising the first, $(c+1)$th, $(2c+1)$th etc. minor studs, the next comprising the second, $(c+2)$th, $(2c+2)$th, etc. minor studs, and so on, each said group of $c$ minor studs being connected to a different one of the studs of the minor selector switch, and by providing cams on the wiper of the automatic selector switch and the contact arm of the major selector switch so that a relay operating circuit which serves to stop the movement of the wiper of the uniselector is completed through the contact arm of the minor selector switch only at the appropriate one of the coupled minor studs. Thus if the studs of the major selector switch are coupled together in threes each group of three being connected to one major stud of the automatic selector switch and the third of the major intervals in the group is effectively required, the wiper of the automatic selector switch will actually operate the changeover means at two major intervals lower than that required, but the cams and contacts are arranged so that the relay operating circuit which stops the movement of the wiper is only completed on the last of the minor studs of the automatic selector switch coupled to the required stud of the minor selector switch; then in reaching that minor stud of the automatic selector switch the wiper will have passed over more than 2b minor studs of the automatic selector switch giving more than 2b coincidences with the minor standard frequencies; since each b coincidences equals one major interval the required two major intervals are made up on the minor studs of the automatic selector switch.

In this way the number of major studs of the automatic selector switch required can be reduced by a factor c, and although the number of minor studs of the automatic selector switch required is increased by the factor c, since the number of major studs normally required is considerably greater than the number of minor studs required there is a considerable saving in studs and hence in the speed of operation of the automatic selector switch.

The aforesaid two features of the invention will be further described by way of example with reference to one embodiment of the invention in which it is required in the final arrangement to tune the variable oscillator to any one of 624 different frequencies having a frequency interval of 90 kc. A frequency doubling stage is included so that the immediate problem is that of tuning to 624 different frequencies spaced at 45 kc. The discriminator is arranged to control to ±22.5 kc. and four alternative heterodyning oscillators are provided increasing successively in frequency by 90 kc. Three studs are provided on the minor selector switch. The arrangement is thus the case $a=\frac{1}{2}$ previously described with $f_0=45$ kc., $a=4$ and $b=3$. Each stud on the minor selector switch has eight contact positions and the frequency interval between the studs of the minor selector switch is 8×45 kc.; the major interval is therefore 24×45 kc. and 26 major frequencies (624/24) are therefore required. There are therefore 26 studs on the major selector switch; these studs are connected together in pairs and each pair is connected to one major stud of the automatic selector switch, so that there are 13 major studs and 6 minor studs in the automatic selector switch; the minor studs are connected in pairs spaced at intervals of three, i. e. first to fourth, second to fifth and third to sixth, and each pair is connected to a stud of the minor selector switch.

The arrangement will be further described with reference to the accompanying drawing which shows only those parts relevant to the invention; the arrangement as a whole is generally similar to that shown in the drawing accompanying the parent specification and corresponding parts are numbered and lettered the same.

In the accompanying drawing, 1 is the automatic selector switch having wiper W and 25 studs numbered 1 to 25; the changeover means for changing from major to minor frequencies are now permanently associated with the 19th stud of the automatic selector switch; the wiper W carries cams which operate contacts at stud 1 and studs 19—25 corresponding to the contacts at studs 1 and studs 20—25 in Fig. 1 of the drawings accompanying said patent.

The major selector switch N2 has 26 studs lettered A–Z which are connected in pairs to the 13 studs 19 to 6 inclusive of the automatic selector switch.

The wiper W is connected to the moving arm of a make-and-break contact OE which is operated by a cam on the moving contact arm of N2 every time the arm passes from one stud to the next e. g. from A to B, B to C etc. The wiper W also carries a fourth cam which is adapted to operate the moving arm of a make-and-break contact MC so that one contact 20—22 is made when the wiper is on any one of the studs 20 to 22 inclusive but so that the other contact 23—25 is made when the wiper is on any of the studs 23 to 25 inclusive; the moving arm of the contact MC is connected to the battery supply through the relay SA which when operated transfers the tuning drive to the discriminator as in the arrangement in accordance with the drawings of said patent. The fixed contacts of the two make-and-break contacts are connected so that when the moving contact arm of the major selector switch N2 is on any of the "odd" studs A, C, E, etc., the circuit for energising relay SA via the wiper W can be completed only through the contact 23—25, and so that when the contact arm is on any of the "even" studs B, D, F, etc., the energising of relay SA can be obtained only through the contact 20—22.

The minor selector switch N1 has 3 studs each having 8 contact positions lettered A to H, I to P, and Q to X respectively; these studs are connected to the studs 20 and 23, 21 and 24, and 22 and 25 respectively of the automatic selector switch.

The moving arm of the switch N1 carries a first cam which operates contacts operating the discriminator reversing relay DR on passing from the first four to the second four contact positions on each stud, e. g. from (A, B, C, D) to (E, F, G, H), a second cam which operates contacts at every other position B, D, F, H etc., which energise a relay RX, and a third cam which at the last two positions CD, GH etc., in each set of four contacts operates contacts which energise a relay RY.

Four alternative heterodyning oscillators, represented by crystals labelled 0 kc., 90 kc., 180 kc. and 270 kc., are adapted to be brought into circuit via contacts RX1, RX2 and RY1 of the relays RX, RY; of these oscillators one is normally required in the arrangement for the setting of the variable oscillator frequency and the remaining three constitute the plurality in accordance with the said first aspect of the invention; the frequency labels thus represent the frequency shifts from the normal position which the oscillators are adapted to produce; the table at the bottom of the accompanying drawing indicates the sequence of events on rotating the contact arm of switch N1 through one complete revolution.

A third feature of the invention relates to the use of the parallel high-pass and low-pass filters to which are applied the beats resulting from the combination of the standard frequency and appropriate heterodyning frequency, and which are adapted, (a) during the initial tuning to produce pulses serving to move the wiper of the automatic selector switch on one step at each coincidence of the variable oscillator frequency with a major or minor standard frequency and (b) to set and maintain the variable oscillator frequency at the position corresponding to the "overlap" of the two filters.

In the arrangement described in said patent one filter only is made operative for purpose (a) so that there is a pulse serving to operate the wiper of the automatic selector switch when the variable oscillator frequency passes through the values giving an output through that filter, but no pulse whilst the variable oscillator frequency passes through the values which would have given an output through the other filter.

According to the third feature of the invention, in order to prevent the automatic selector switch from being operated by spurious pulses during this "no pulse" period, the second filter is also made operative but in a negative sense, so that the uniselector is held unoperated during this period.

This may be achieved by applying the rectified outputs of the two filters in opposite senses to the control grid of a thermionic valve whose output current is adapted to operate the uniselector. Alternatively the two rectified outputs may be applied to give opposite polarisations of a relay adapted to operate the automatic selector switch.

I claim:

1. Apparatus for tuning a variable electrical oscillator including driving means capable of varying continuously in the same direction the frequency of the oscillator, means for generating alternatively a first set of standard frequencies spaced at minor intervals, to one of which the variable oscillator has to be tuned, and a second set of standard frequencies spaced at major intervals, an automatic selector switch including a wiper, a plurality of studs and electrically actuable wiper moving means, means responsive to coincidences between the frequency of the variable oscillator and said standard frequencies for applying to the automatic selector switch, on the occasion of each such coincidence, a pulse serving to move its wiper one step, changeover means associated with the automatic selector switch for causing the second set of standard frequencies to be replaced by the first set when the wiper reaches a predetermined stud of the automatic selector switch, means for varying at the will of an operator the number of steps that the wiper must take under the control of the coincidences before it reaches the said predetermined stud, and stopping means adapted to be associated at the will of the operator with different studs of the automatic selector switch and serving to put the driving means out of action when the wiper reaches the stud with which the stopping means are associated, wherein the said stopping means are associated with positioning means adapted to set the frequency of the variable oscillator at the will of the operator either to a value $f_m+D$ or to a value $f_m-D$, where $f_m$ is a frequency determined by the stud of the automatic selector switch with which the stopping means is associated and D is substantially a constant independent of $f_m$, and comprising a plurality of heterodyning oscillators each adapted effectively to vary at the will of the operator the said frequency $f_m$ each by a different amount and the appropriate one of which is arranged to be automatically selected by the stopping means.

2. Apparatus according to claim 1 wherein the said positioning means associated with the stopping means comprises a mixer in which the oscillations from the variable oscillator are adapted to be combined both with the standard oscillations and with oscillations from one of the said heterodyning oscillators, a pair of filters connected in parallel in the output of the said mixer and having pass ranges one from substantially zero frequency to a frequency just greater than D and the other from a frequency just less than D to a higher frequency, means whereby the output of one filter is adapted to vary the frequency of the variable oscillator in one direction and the output of the other filter is adapted to vary the frequency of the variable oscillator in the other direction but whereby the frequency of the variable oscillator is not varied if both outputs are simultaneously effective, reversing means for reversing the directions in which the said outputs are adapted to vary the frequency of the variable oscillator, and means associated with the stopping means for selecting the appropriate one of the said heterodyning oscillators and connecting it into the circuit so that it is adapted to supply oscillations to the said mixer.

3. Apparatus according to claim 1 wherein the means for associating the stopping means and positioning means with a stud of the automatic selector switch comprises a minor selector switch adapted to connect the said stud of the automatic selector switch into a relay operating circuit and thereby enable the relay operating circuit to be completed when the wiper of the automatic selector switch makes contact with that stud, the said relay being adapted when operated to actuate the stopping means.

4. Apparatus according to claim 2 wherein the means for associating the stopping means and positioning means with a stud of the automatic selector switch comprises a minor selector switch adapted to connect the said stud of the automatic selector switch into a relay operating circuit and thereby enable the relay operating circuit to be completed when the wiper of the automatic selector switch makes contact with that stud, the said relay being adapted when operated to actuate the stopping means.

5. Apparatus according to claim 4 wherein the said minor selector switch comprises a contact arm and a plurality of studs with which the contact arm is adapted successively to make contact, each stud of the minor selector switch being connected to a different one of the studs of the automatic selector switch wherein there are $n$ alternative heterodyning oscillators and each stud of the minor selector switch comprises $2n$ contact positions, $A_1A_2 \ldots A_{2n}$ say, and wherein the contact arm of the minor selector switch carries cams adapted to operate contacts which (i) associate a different heterodyning oscillator with the said mixer on passing from one pair of the said contact positions to the next, from $(A_1A_2)$ to $(A_3A_4)$ and from $(A_3A_4)$ to $(A_5A_6)$ etc., and (ii) operate the said reversing means on passing from one said contact position to the next from $A_1$ to $A_2$ or $A_2$ to $A_3$ etc.

6. Apparatus for tuning a variable electrical oscillator including driving means capable of varying continuously in the same direction the frequency of the oscillator, means for generating alternatively a first set of standard frequencies spaced at minor intervals, to one of which the variable oscillator has to be tuned, and a second set of standard frequencies spaced at major intervals, an automatic selector switch including a wiper, a plurality of studs and electrically actuable wiper moving means, means responsive to coincidences between the frequency of the variable oscillator and said standard frequencies for applying to the automatic selector switch, on the occasion of each such coincidence, a pulse serving to move its wiper one step, changeover means permanently associated with a predetermined stud of said automatic selector switch for causing said second set of standard frequencies to be replaced by said first set when the wiper reaches said predetermined stud, means for varying at the will of an operator the number of steps that said wiper must take under control of said coincidences before it reaches said predetermined stud, and stopping means adapted to be associated at the will of the operator with different studs of said automatic selector switch and serving to put said driving means out of action when the wiper reaches the stud with which said stopping means is associated, wherein the said stopping means is associated with positioning means adapted to set the frequency of the variable oscillator at the will of the operator either to a value $f_m+D$ or to a value $f_m-D$, where $f_m$ is a frequency determined by the stud of the automatic selector switch with which the stopping means is associated and D is substantially a constant independent of $f_m$, and comprising a plurality of heterodyning oscillators each adapted effectively to vary at the will of the operator the said frequency $f_m$ each by a different amount and the appropriate one of which is arranged to be automatically selected by the stopping means.

7. Apparatus according to claim 6 wherein the means for associating the stopping means and positioning means with a stud of the automatic selector switch comprises a minor selector switch adapted to connect the said stud of the automatic selector switch into a relay operating circuit and thereby enable the relay operating circuit to be completed when the wiper of the automatic selector switch makes contact with that stud, the said relay being adapted when operated to actuate the stopping means.

8. Apparatus according to claim 7 wherein the said minor selector switch comprises a contact arm and plurality of studs with which the contact arm is adapted successively to make contact, each stud of the minor selector switch being connected to a different one of the studs of the automatic selector switch, wherein there are $n$ alternative heterodyning oscillators and each stud of the minor selector switch comprises $2n$ contact positions, $A_1A_2 \ldots A_{2n}$ say, and wherein the contact arm of the minor selector switch carries cams adapted to operate contacts which (i) associate a different heterodyning oscillator with the said mixer on passing from one pair of the said contact positions to the next, from $(A_1A_2)$ to $(A_3A_4)$ and from $(A_3A_4)$ to $(A_5A_6)$ etc., and (ii) operate the said reversing means on passing from one said contact position to the next, from $A_1$ to $A_2$ or $A_2$ to $A_3$ etc. and wherein each of the minor studs of the automatic selector switch is connected to one of the studs of the said minor selector switch.

9. Apparatus according to claim 8 wherein the number of steps that the automatic selector switch must take under the control of coincidences between the variable oscillator frequency and the set of standard frequencies spaced at major intervals before it reaches the stud with which the changeover means is associated is determined by the setting of the major selector switch having a plurality of studs and a contact arm adapted to make contact with each of the said studs in succession, wherein each said stud is connected to one of the major studs of the automatic selector switch so that a relay operating circuit initiating the control of the automatic selector switch by the said coincidences is adapted to be completed when the wiper of the automatic selector switch is moved to the stud connected to the major switch stud selected by the contact arm of the major switch.

10. Apparatus according to claim 9 wherein there are $p$ standard frequencies spaced at major intervals each associated with one of $p$ studs, say $P_1P_2 \ldots P_p$, of the major selector switch, wherein the said $p$ studs are connected in groups of $o$ studs per group $(P_1P_2 \ldots P_c)$, $(P_{c+1}P_{c+2} \ldots P_{2c})$ etc. $p/c$ being integral, wherein each group is connected to a different one of $p/c$ major studs of the automatic selector switch, wherein there are $q$ standard frequencies spaced at minor intervals each associated with one of $q$ studs, say $Q_1Q_2 \ldots Q_q$, of the minor selector switch, wherein there are $cq$ automatic selector switch minor studs, and wherein the said $cq$ minor studs are connected together in $o$ groups of $c$ per group, the members in each group being spaced at intervals $q$, one group consisting of the first, $(q+1)$th, $(2q+1)$th $\ldots$ to $[(c-1)q+1]$'th minor studs, another consisting of the second, $(q+2)$th, $(2q+2)$th $\ldots [(c-1)q+2]$'th minor studs, etc., wherein each said group of $c$ minor studs is connected to a different one of the studs of the minor selector switch and wherein cams on the contact arm of the major selector switch and on the wiper of the automatic selector switch are adapted to operate contacts associated with the positions of the studs of the major selector switch and the automatic selector switch and with a relay operating circuit in such a manner that the said relay operating circuit is completed so as to operate the relay only at the automatic selector switch minor stud corresponding to the settings of the major and minor selector switches, the said relay being adapted when operated to stop the movement of the wiper of the automatic selector switch.

11. Apparatus according to claim 2 where the output of one of the said filters is adapted before the operation of the stopping means to produce a pulse serving to move the wiper of the automatic selector switch on one step at each coincidence of the variable oscillator frequency with a standard frequency, and wherein the other of the said filters is arranged so that its out-put is adapted to hold the automatic selector switch unoperated during the periods in which there is no output from the first said filter.

LUIS CHARLES STENNING.

No references cited.